(12) United States Patent
Anders

(10) Patent No.: US 6,604,144 B1
(45) Date of Patent: *Aug. 5, 2003

(54) DATA FORMAT FOR MULTIMEDIA OBJECT STORAGE, RETRIEVAL AND TRANSFER

(75) Inventor: Mark Anders, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/885,672

(22) Filed: Jun. 30, 1997

(51) Int. Cl.$^7$ .............................................. G06F 15/16
(52) U.S. Cl. ...................................... 709/231; 709/316
(58) Field of Search ........................... 395/615, 200.33, 395/806, 145, 183.21; 370/94.1, 350; 345/332, 155, 349; 709/201, 316, 227, 231, 219, 330, 202, 206, 101, 107; 707/522, 4, 10, 103, 505, 513, 9, 509, 3; 340/725; 548/426, 6; 380/49, 20; 382/239; 375/341, 295; 713/201; 371/33; 358/1.15

(56) References Cited

U.S. PATENT DOCUMENTS

| | | | | |
|---|---|---|---|---|
| 4,498,079 A | * | 2/1985 | Ghosh et al. ................ 340/725 |
| 5,303,302 A | * | 4/1994 | Burrows ....................... 380/49 |
| 5,327,559 A | | 7/1994 | Priven et al. ................. 709/101 |
| 5,421,012 A | * | 5/1995 | Khoyi et al. ................. 709/107 |
| 5,481,543 A | * | 1/1996 | Veltman ..................... 370/94.1 |
| 5,487,167 A | | 1/1996 | Dinallo et al. .............. 395/650 |
| 5,513,305 A | * | 4/1996 | Maghbouleh ............... 395/145 |
| 5,577,258 A | | 11/1996 | Cruz et al. ................... 395/800 |
| 5,594,911 A | | 1/1997 | Cruz et al. ................... 395/800 |
| 5,598,566 A | | 1/1997 | Pascucci et al. ............ 395/750 |
| 5,613,057 A | * | 3/1997 | Caravel ...................... 395/806 |
| 5,632,009 A | * | 5/1997 | Rao et al. ................... 707/509 |
| 5,642,478 A | * | 6/1997 | Chen et al. ............ 395/183.21 |
| 5,657,096 A | | 8/1997 | Lukacs ....................... 348/585 |
| 5,666,137 A | * | 9/1997 | Coelho et al. .............. 345/155 |
| 5,701,368 A | * | 12/1997 | Jung ........................... 382/239 |
| 5,706,502 A | | 1/1998 | Foley et al. ................ 395/610 |
| 5,748,960 A | * | 5/1998 | Fischer ....................... 709/316 |
| 5,754,242 A | | 5/1998 | Ohkami ...................... 348/441 |
| 5,754,566 A | | 5/1998 | Christopherson et al. ........................ 371/40.18 |
| 5,757,416 A | * | 5/1998 | Birch et al. ..................... 348/6 |
| 5,764,241 A | | 6/1998 | Elliott et al. ................ 345/473 |
| 5,768,510 A | * | 6/1998 | Gish ...................... 395/200.33 |
| 5,778,372 A | * | 7/1998 | Cordell et al. .............. 707/100 |
| 5,781,739 A | * | 7/1998 | Bach et al. .................. 709/227 |
| 5,784,056 A | * | 7/1998 | Nielsen ....................... 345/332 |
| 5,787,454 A | | 7/1998 | Rohlman ........................ 711/5 |
| 5,813,014 A | * | 9/1998 | Gustman ..................... 707/103 |
| 5,818,832 A | * | 10/1998 | McCalister ................. 370/350 |
| 5,818,935 A | * | 10/1998 | Maa ............................. 380/20 |
| 5,841,478 A | * | 11/1998 | Hu et al. ..................... 348/426 |
| 5,841,819 A | * | 11/1998 | Hu et al. ..................... 375/341 |
| 5,860,073 A | * | 1/1999 | Ferrel et al. ................ 707/522 |
| 5,877,966 A | | 3/1999 | Morris et al. ............... 364/512 |
| 5,884,014 A | * | 3/1999 | Huttenlocher et al. ..... 358/1.15 |
| 5,892,512 A | * | 4/1999 | Donnelly et al. ........... 345/349 |
| 5,892,909 A | * | 4/1999 | Grasso et al. ............... 709/201 |
| 5,907,837 A | * | 5/1999 | Ferrel et al. ................... 707/3 |
| 5,933,435 A | * | 8/1999 | Shah et al. .................... 371/33 |
| 5,956,716 A | * | 9/1999 | Kenner et al. ................ 707/10 |
| 5,968,119 A | | 10/1999 | Stedman et al. ............ 709/219 |
| 5,995,554 A | * | 11/1999 | Lang ........................... 375/295 |
| 6,006,332 A | * | 12/1999 | Rabne et al. ................ 713/201 |
| 6,016,158 A | | 1/2000 | Mackinnon ..................... 348/7 |
| 6,065,058 A | | 5/2000 | Hailpern et al. ............ 709/231 |
| 6,173,327 B1 | * | 1/2001 | De Borst et al. ........... 709/231 |
| 6,189,048 B1 | * | 2/2001 | Lim et al. ................... 709/330 |
| 6,269,403 B1 | * | 7/2001 | Anders ....................... 709/231 |

OTHER PUBLICATIONS

Nittel et al, Geo POM: A Heterogeneous Geoscientific Persistent Object System. IEEE Feb. 1997.*
DeFazio et al, Database Extensions for Complex Domains IEEE 1996.*
Lemay, Teach Yourself Web Publishing with HTML 3.2, 1996.*
Brown, M.R., et al., *Special Edition Using Netscape 3*, pp. 254, 263–265, 268–270, 428 (1996).
McGowan, J.F., "AVI Overview", http://think.atr.net/mirror/faq/rt . . . /AVI_Graphics_Format_Overview.html, pp. 1–25, (1997).
Zellweger, P.T., et al., "Fluid Links for Informed and Incremental Link Transitions", *Proceedings of Hypertext '98*, , Pittsburgh, PA, pp. 1–8, (1998).

* cited by examiner

Primary Examiner—Mark Powell
Assistant Examiner—Thong Vu
(74) Attorney, Agent, or Firm—Woodcock Washburn LLP

(57) ABSTRACT

In a computer environment, a new storage and delivery data format for multimedia object sets increases performance and improves the user experience by reducing the transactions needed to retrieve a set of n objects from n to 1. The object data is interleaved with data definition entries identifying respective object data into a data format comprising a single stream for storage and/or delivery. The data format eliminates the need for multiple, asynchronous transactions thus reducing latency in the data transfer process. Moreover, the data format allows for optimization of how the object data is prioritized and interleaved to achieve desired performance objectives upon delivery of the multimedia objects.

34 Claims, 17 Drawing Sheets

```
GET/jamhome.htm HTTP/1.0
Accept: text/plain
Accept: text/html
Accept: */*
User-Agent: Mozilla/2.0
```
— 110

| HTTP/1.0 200 OK | — 132 |
| Server: Microsoft-PWS-95/2.0<br>MIME-version 1.0 | — 134 |
| Content-type: text/html | ⎫ |
| Last-Modified: Sun Feb 11 11:27:31 1996 | ⎬ 136 |
| Content-Length: 1463 | — 138 |
| `<HTML>`<br>`<HEAD>`...<br>  (Rest of HTML document)<br>...`</HTML>` | — 140 |

```
<HTML>
<HEAD>
<TITLE>Untitled</TITLE>
</HEAD>
<BODY BACKGROUND="Images/watermrk.gif">            142
<H1><CENTER><FONT SIZE=7 COLOR=#000000 FACE="Arial">
Jammer Home Page</FONT><FONT SIZE=7 COLOR=#000000>
</FONT></CENTER></H1>
<P>
<CENTER><IMG SRC="Images/underconstruct.gif" ALIGN="ABSMIDDLE">    144
</CENTER>
<P>
<TABLE >                                                       146
<TR><TD WIDTH=294><IMG SRC="Images/istudio.gif"></B></TD>
<TD WIDTH=294><B><FONT COLOR=#FF00FF FACE="Arial">
Welcome to the <I><B>Jammer</B></I><b> Home Page! Jammer is a simple
way to control how Web media moves from the server to the client, and
improve both performance, and the user experience. </B></FONT></B>
</TD></TR>
</TABLE>
<P>
<BR>
<FONT SIZE=2 FACE="Arial">This paper describes a new storage and
delivery strategy for multi-media object sets for high latency
environments such as the World Wide Web. It increases performance,
and improves the user experience, by reducing the number of transactions
to retrieve a set of <I>n</I> objects, from <I>n</I> to 1, without
compromising the ability of the viewer to progressively render
pieces of the objects. Jammer accomplishes this by storing sets
of objects in a single file (or storage unit), and arranging the
object's data in an optimized <I>interleaved</I> format, so that
the file image when stored on the server is identical to, or better
than, how the objects arrive on the client machine as the result
of multiple requests.   </FONT>
<P>
</BODY>
</HTML>
```

DATA DEFINITION ENTRY

```
194 ── Define: <URL><CR><LF>
196 ── SID: <number><CR><LF>
      <CR><LF>
198 ── <HTTP Header>
      <CR><LF>
```
192

FIG. 9

DATA PACKET

```
202 ── Data: <SID#><CR><LF>
204 ── Length: <Size in bytes><CR><LF>
      <CR><LF>
206 ── <object data>
```
200

FIG. 10

DATA FORMAT FOR MULTIMEDIA OBJECT STORAGE, RETRIEVAL AND TRANSFER

BACKGRUOND OF THE INVENTION

1. Field of the Invention

The present invention relates to multimedia systems, and more particularly, to a storage and delivery system for multimedia objects in a computer environment, such as the World Wide Web.

2. Description of Related Technology

The World Wide Web (Web) is part of a global computer network known as the Internet. Scientists and academicians initially developed and used the Internet to share information and collaborate. The Web functions as an object based multimedia system. It allows for the creation, storage and delivery of multimedia objects. Recently, on-line service providers, such as Microsoft Network, CompuServe, Prodigy and America Online, have linked to the Web. This enables their customers to access a variety of information and communication services available from independent content providers and other Web users. For example, a typical customer can access electronic mail, news services, weather services, bulletin board services and travel services on the Web.

Independent content providers typically create pages to communicate information and services they provide for their Web customers. A customer views a page on a computer screen using a Web browser, such as Microsoft Explorer or Netscape Navigator, installed on the computer. The structure and appearance of a Web page are defined using HyperText Markup Language (HTML). The browser retrieves and interprets the HTML defining a page to display it on a user's computer screen. A typical Web page may have multiple objects including HTML text, a background image, icons, audio and bitmaps for several images.

A Web browser accesses a page when a user enters a Universal Resource Locator (URL) or selects a link to a page's URL using a pointing device such as a mouse or glide pad. The browser retrieves the page by first checking its cache of previously retrieved objects. In this context, a cache is a collection of previously requested objects that a browser maintains in local storage on the user's computer. If the requested object data exists in cache, the browser fetches the object from the cache. Otherwise, the browser must retrieve the object from a remote computer over the Web. Data transfer over the Web is a very slow process when compared to retrieving the same object from a cache on the local disk of the user's computer.

Data transfer speed is basically the result of the bandwidth and latency of a connection. Bandwidth is the speed with which data moves over a connection. Improved bandwidth results by increased carrier capacity and/or increased transmission speed over the carrier. For example, a user can increase the bandwidth of a Web connection over an analog phone line carrier by increasing the modem transmission speed from 14,400 bits per second to 28,800 bits per second. A user may similarly increase the bandwidth of a Web connection by using a digital phone line carrier, such as an Integrated Services Digital Network (ISDN) line, capable of carrying two data channels each at 64,000 bits per second. Latency refers to the delay between the time a request for data is made and the time that the data is received. It results from the logistics of establishing and maintaining a connection over a carrier involving various types of handshakes needed to initiate and complete data transfer. Thus, latency is usually independent of the size of the data being sent over the carrier.

Data transfers over the Web conform to the HyperText Transfer Protocol (HTTP). HTTP manages connections between those who request information, clients, and those who provide information, servers. In the HTTP model, a client establishes a connection to a remote server and then issues a request. The server processes the request, returns a response and closes the connection. Importantly, the HTTP model only permits a single transaction per connection. In addition, HTTP uses the Transmission Control Protocol (TCP) as a transport layer. A transport layer is a mechanism for the transfer of data between clients and servers that ensures delivery of in sequence, error-free data with no losses or duplications. TCP establishes connections using a three-part handshake as follows: the client sends a connection request, the server responds and the client acknowledges the response, at which time the client can also send data.

Certain design features of HTTP interact poorly with TCP causing problems with data transfer performance. Opening a connection to a server creates a latency of at least two round trips over the network because a client must wait for a server to send its connection response. Similarly, TCP uses a mechanism called slow start to negotiate the data transfer speed over a connection. To prevent overrunning a receiving computer, slow start initiates transfer at a low data transfer rate and progressively increases the data transfer rate as more chunks of data are received successfully. When transferring large amounts of data over a single connection, the impact of slow start and connection latency are minimal. However, when transferring small amounts of data over a large number of connections, the impact of slow start and latency from multiple connections is devastating.

In the early days of the Web, cumulative delays from slow start and connection latency were tolerable because early Web pages included a single HTML page with one or two images. However, the complexity of Web pages is increasing. Modern Web page designs include more objects, such as bitmaps, audio, ActiveX controls and Java Applets, and thus HTTP requires numerous transactions to transfer each page over the Web. Thus, the cumulative latency due to TCP handshaking and slow start becomes a substantial performance limitation. Moreover, a HTML page includes the names of referenced objects and a browser cannot request these referenced objects until it has retrieved and interpreted the HTML defining the page. Thus, the latency of retrieving the HTML defining a page can create a cascade of delays in requesting embedded objects. Cascaded round trip delays from opening multiple server connections to retrieve embedded objects and subsequent slow start delays often result in situations where users can do no useful work because the system is waiting instead of transmitting data.

Lastly, numerous HTTP transactions severely impact the data transfer performance of high-speed satellite and cable modem systems. In these systems, the transmission speed from a server to a client, the "downstream" connection, is substantially higher than the transmission speed from client to server, the "upstream" connection. For example, wireless satellite links and cable modems are capable of transmitting data "downstream" at 10,000,000 bits/second rate while transmission of "upstream" browser requests often occurs at a rate of 768,000 bits/second (a "fractional" T1 connection, about 13 times slower). For a Web page having numerous objects, the slow speed "upstream" request connection limits data transfer performance due to the response latency of multiple HTTP requests for these objects.

SUMMARY OF THE INVENTION

The present invention addresses these performance limitations by improving the efficiency of object retrieval and transfer in multimedia computer environments. In contrast to the multiple transactions currently required to retrieve multiple objects in HTTP, the present invention reduces the number of transactions to retrieve a set of n objects from n to 1, thereby substantially reducing the latency due to slow start and cascaded round trip delays from opening multiple server connections. This increases delivery performance and improves the user experience by substantially reducing the delays in the transfer and rendering of images on the user's display.

The present invention includes data for multiple objects in a single data stream in an optimized interleaved format. Object data is interleaved with data definition entries identifying respective object data into a data format comprising a single stream for storage and delivery. The data format eliminates the need for multiple, asynchronous transactions. Moreover, the data format enables one to customize and optimize how the object data is prioritized and interleaved to achieve a desired effect on the viewer upon delivery of the multimedia data.

One aspect of the present invention includes a data format for storing, transferring and retrieving, in a computer environment having a storage, a stream of objects comprising object data packets stored within the storage for each object in the stream and at least one data definition entry corresponding to each object in the stream, wherein said at least one data definition entry is interleaved with said object data packets such that a data definition entry corresponding to one of the objects in the stream precedes any object data packets of said one object in the stream.

Another aspect of the present invention includes a system for transmitting a page comprising a data repository for a stream representing the page, wherein said stream comprises object data packets interleaved with data definition entries, a browser assembling said object data packets with reference to said data definition entries so as to display the page represented by said stream and a network communicating said stream between said data repository and said browser.

Lastly, another aspect of the present invention includes a system for transmitting a page comprising a data repository for a stream representing the page, wherein said stream comprises object data packets interleaved with data definition entries, a browser assembling said object data packets with reference to said data definition entries so as to display the page represented by said stream and a computer communicating said stream between said data repository and said browser.

BRIEF DESCRIPTION OF THE DRAWINGS

FIG. 2 is an HTTP Get command for retrieving a file from a server.

FIG. 3 is an HTTP response header resulting from the HTTP Get command of FIG. 2.

FIG. 4 is the HTML code defining the Web page design of FIG. 1b.

FIG. 9 is an example of a data definition entry of the present invention.

FIG. 10 is an example of a data packet of the present invention.

DETAILED DESCRIPTION OF THE PREFERRED EMBODIMENTS

The following detailed description of the preferred embodiments presents a description of certain specific embodiments to assist in understanding the claims. However, one may practice the present invention in a multitude of different embodiments as defined and covered by the claims.

For convenience, the description comprises four sections: Object Retrieval Overview; the Jammer Data Format; Data Storage, Retrieval and Transfer Systems; and Summary. The first section provides an overview of object retrieval in the current Web environment, the following two sections describe the Jammer data format and preferred embodiments for practicing the Jammer data format of the present invention, and the remaining section summarizes advantageous features of the present invention.

I. Object Retrieval Overview

Figure 1A:
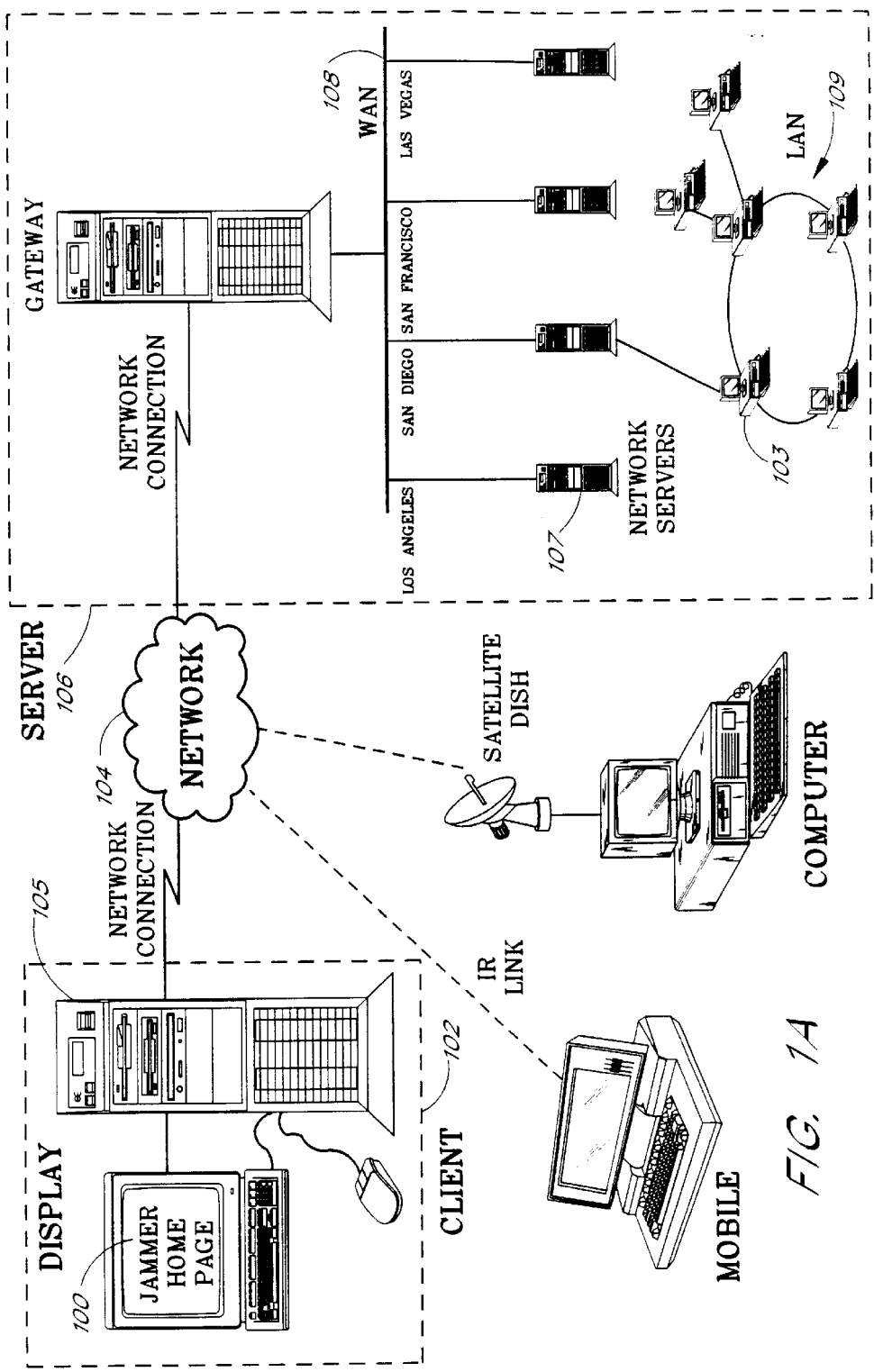
FIG. 1a is an example of a computer environment for displaying a typical Web page design of the present invention.
Figure 1B:
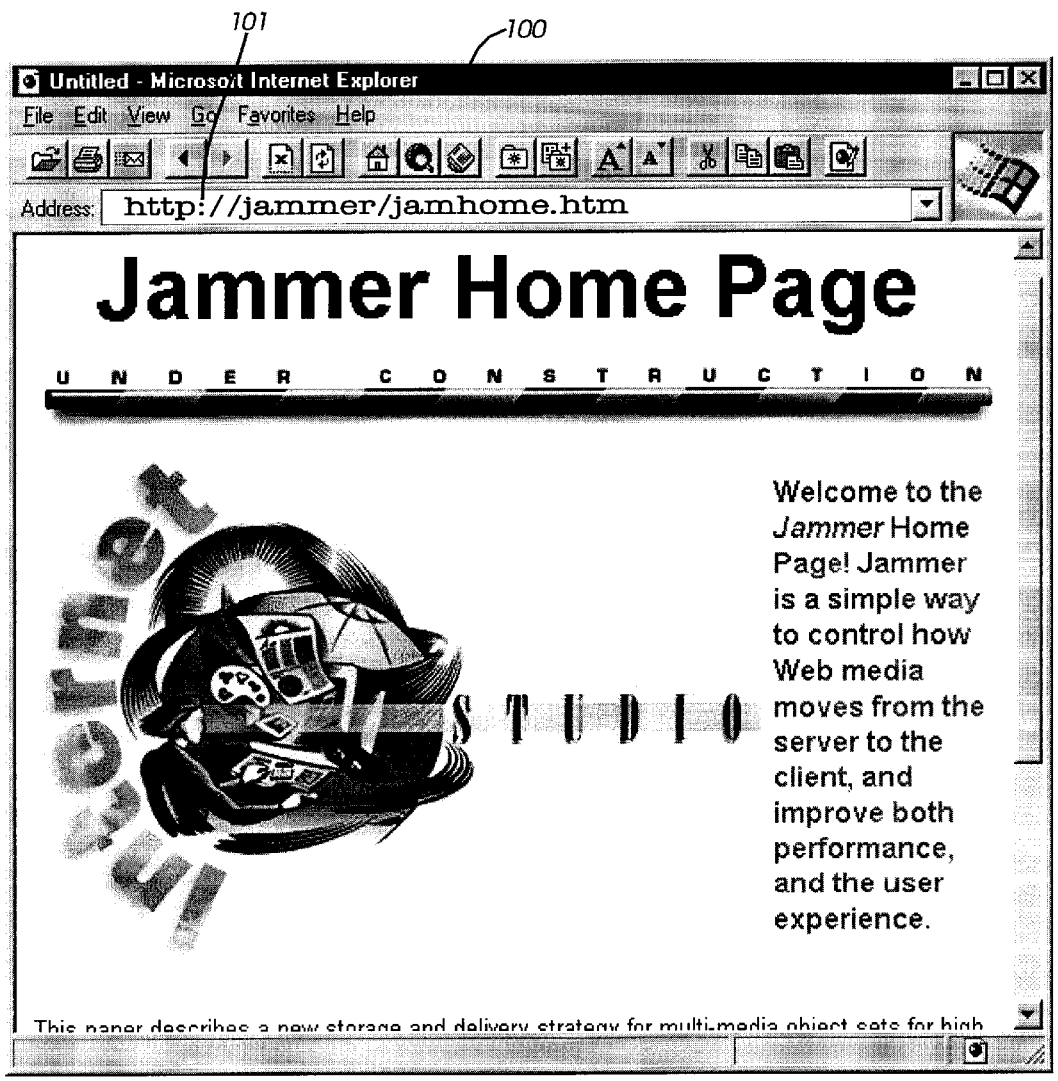
FIG. 1b is a typical Web page design as viewed on the visual display of a client computer.
Figure 5A:
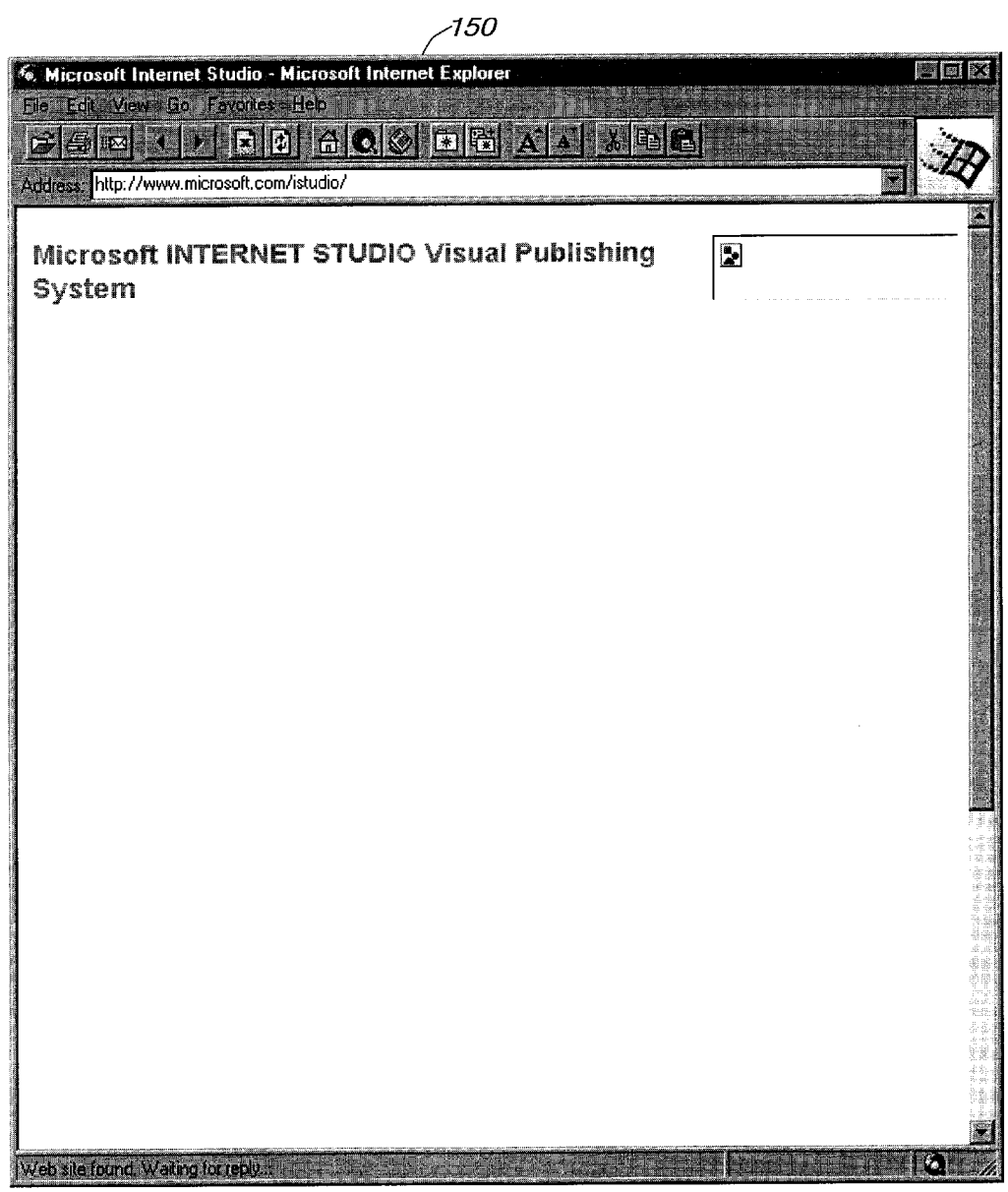
FIGS. 5A–5E comprise a sequence of displays for the Web page design of FIG. 1b as it undergoes progressive rendering.
Figure 5B:
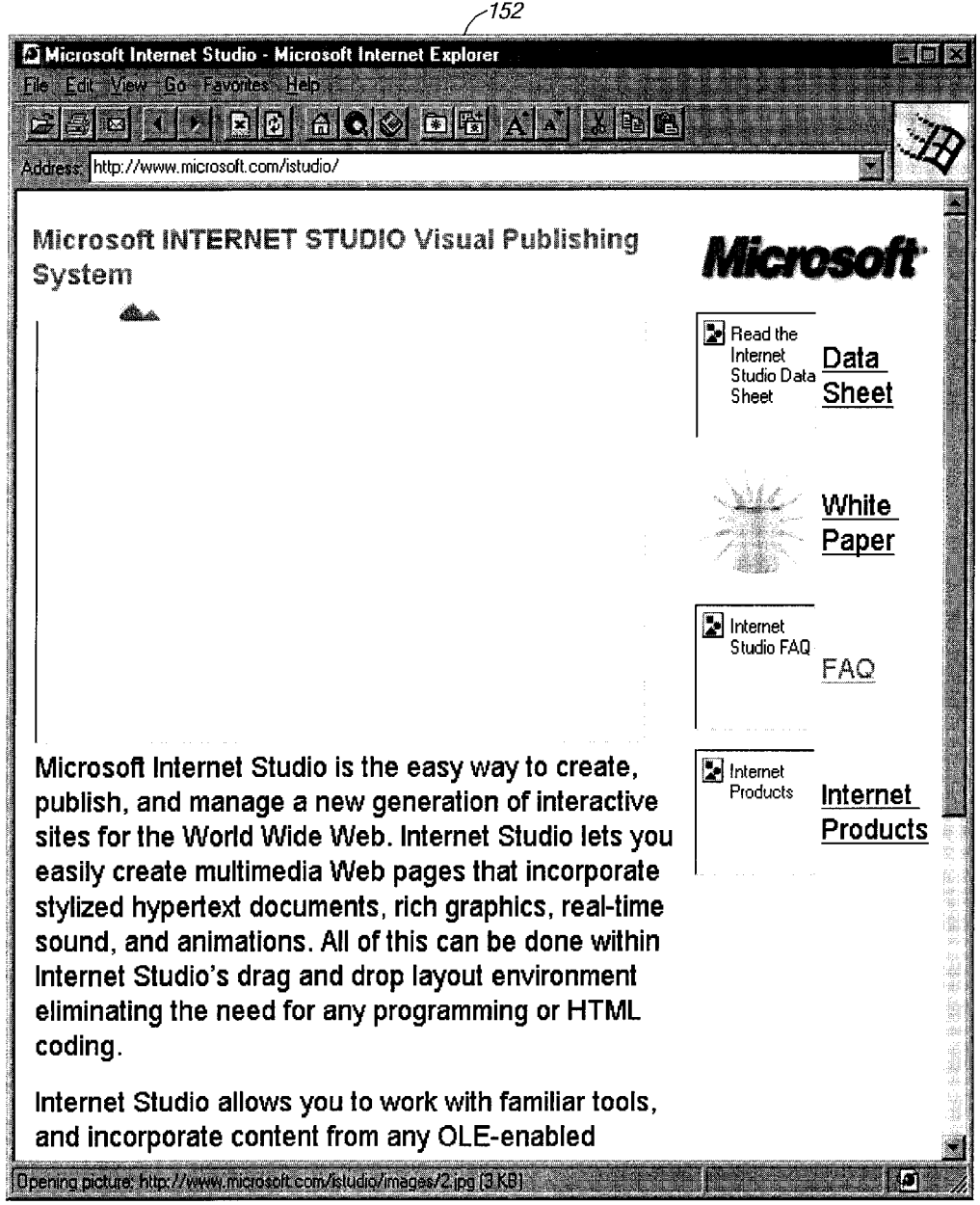
Figure 5C:
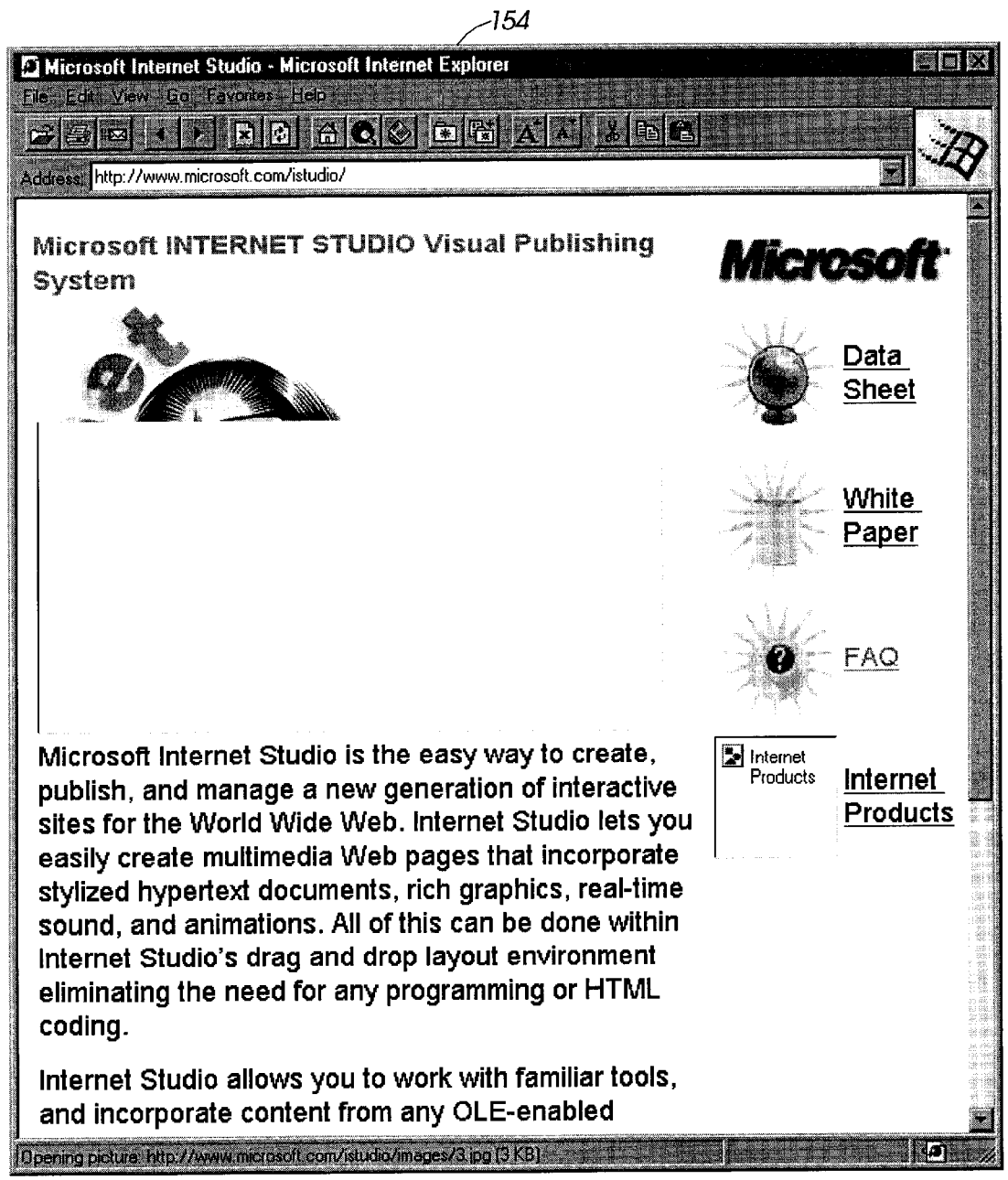
Figure 5D:
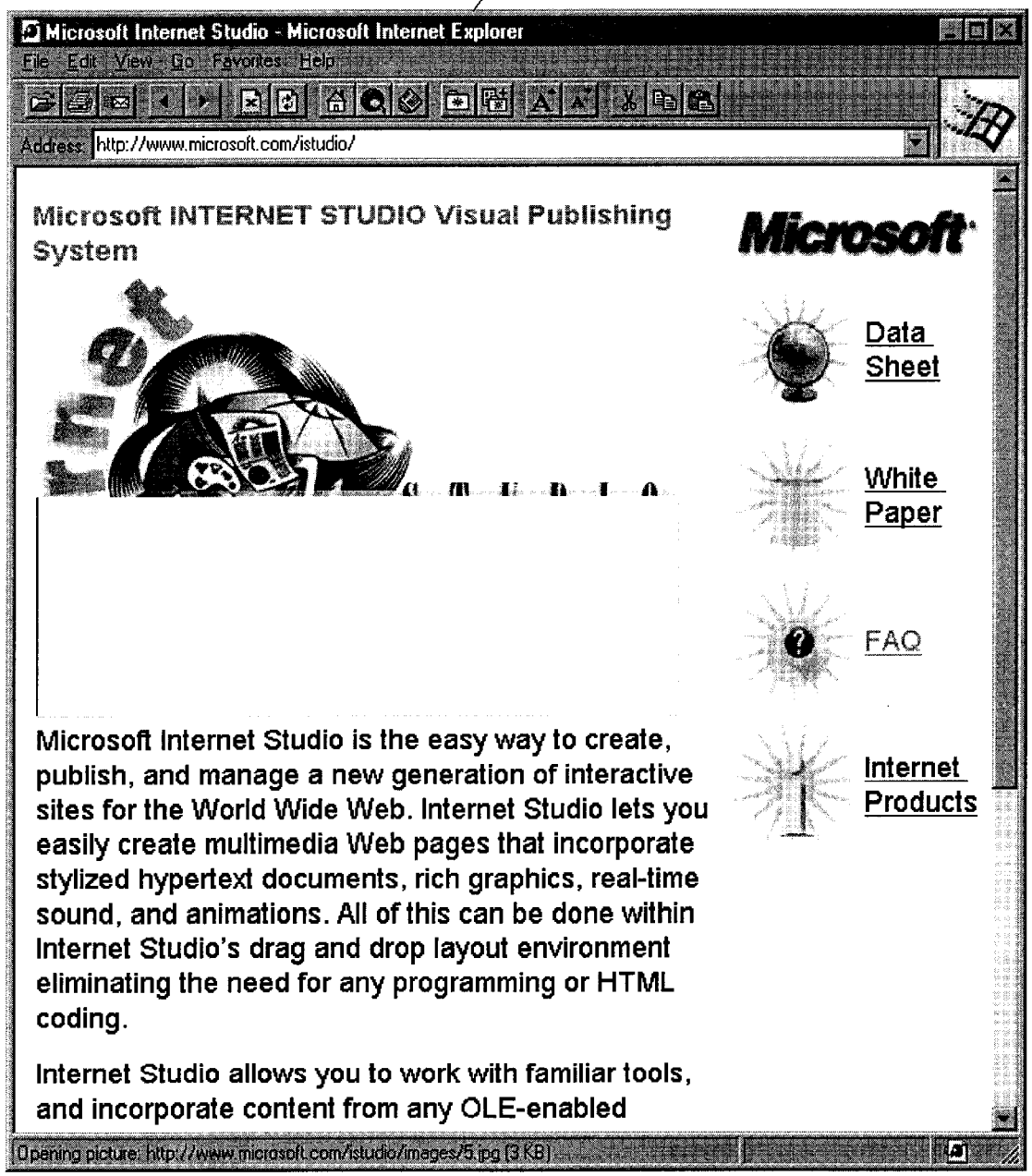
Figure 5E:
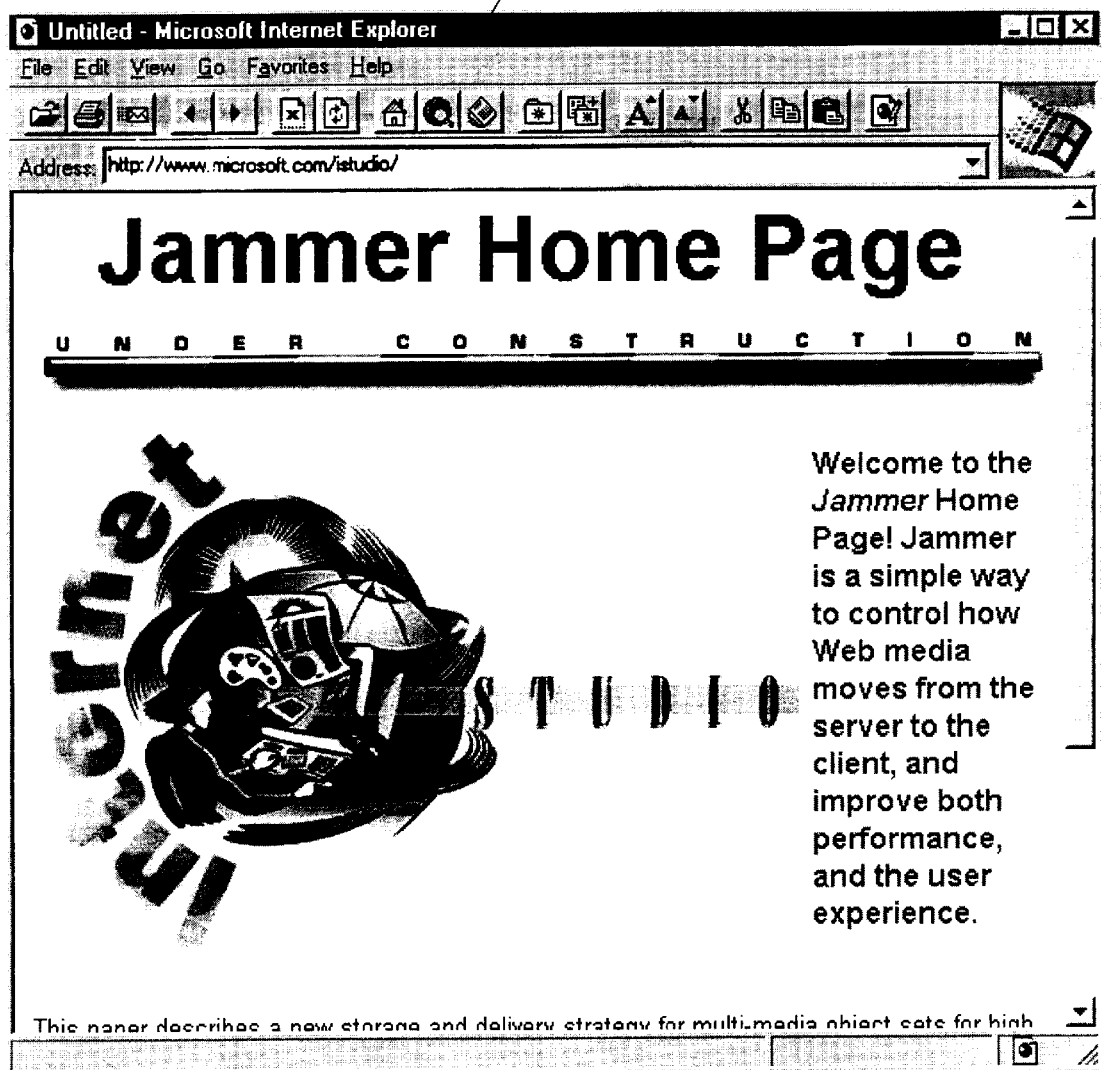

FIG. 1a is an example of a computer environment for practicing the present invention. A client 102 communicates with a server 106 by means of a network 104, such as the World Wide Web. The server 106 may include a gateway to a Wide Area Network (WAN) 108 having a plurality of Local Area Networks (LANs) 109. A browser 103, residing on a client 102, displays a page design for a Jammer home page 100 (FIG. 1b) on the World Wide Web. A user can view this page by entering, or selecting a link to, the URL 101 "http://jammer/jamhome.htm" in a browser, such as Microsoft Explorer or Netscape Navigator, executing on the user's computer. The URL 101 (FIG. 1b) for the Jammer home page informs the browser to obtain the file jamhome.htm from the jammer server. The file jamhome.htm is the base object defining the Jammer home page. To display this page, a browser 103 hierarchically retrieves objects comprising the page. The browser 103 first retrieves a base object having HTML defining the page. To obtain the base object, the browser 103 first opens a network connection to an HTTP server named jammer. Referring now to FIG. 2, the browser then sends an HTTP Get command 110 to the jammer server for a document named jamhome.htm. In response, the jammer server locates and sends the jamhome- .htm document to the client 102 using the HTTP response format shown in FIG. 3. The HTTP response format includes a header 130 followed by object data 140 of the requested document.

Referring to FIG. 3, the header 130 comprises items designed to provide the browser with information regarding the server, its capabilities, the status of the response and properties of the data returned. The first header item 132 identifies the protocol version and status code. For example, data returned for jamhome.htm is in HTTP version 1.0 format and a "200 OK" return code indicates that the server carried out this request successfully. The second header item 134 notifies the browser of the server type and identifies the data encoding used. For example, the jammer server is Microsoft-PWS95/2.0 compatible and transfers data encoded using Multipurpose Internet Mail Extensions (MIME) version 1.0. The next header items 136 inform the browser of the content data type and the last modification date for the data. For example, jamhome.htm is HTML text and the last modification to the text occurred on Sunday, February 11. Finally, the remaining header item 138 notifies the browser of the amount of data transferred. For example, the jamhome.htm file contains 1463 bytes of data.

The browser checks the HTTP header 130 to determine if its request was successful and to identify the received document type and the amount of object data The browser then removes the HTTP header 130 and places the object data 140 in a cache for quick access at a later time. The browser then identifies the object data type and begins to process the data. For example, the HTTP header 130 indicates that the object data 140 is of the type HTML. The browser thus invokes its HTML handler to display the text and to parse through the HTML object data 140 to find references to other objects on the page. Referring now to FIG. 4, the HTML base object 141 for the Jammer home page 100 contains references to three embedded image objects stored on the jammer server: a background image 142, an under construction image 144 and an Internet Studio image 146. To assemble and display a page such as the Jammer home page 100 of FIG. 1, the browser must retrieve all objects referenced within the retrieved HTML base object.

As the browser parses through the HTML base object 141 to locate references to embedded objects, it proceeds through the same steps to retrieve the embedded object data. For each reference to an embedded object, the browser first checks its cache to determine if the object data resides in cache. If so, the browser retrieves the object data from cache. Otherwise, the browser opens a connection to the server having the object data and transmits an HTTP Get command to retrieve the object data. The server in turn responds with an HTTP response header with information regarding the server, its capabilities, the status of the response and properties of the object data returned. Note that the embedded objects 142, 144, 146 referenced in FIG. 4 are of the GIF data type so the browser must invoke its GIF handler to process the object data.

The browser may also request multiple objects simultaneously. To do this, the browser issues multiple requests to the server, each request requiring a separate connection to the server. The browser then processes the data for each object as it arrives from the server. Using a technique called progressive rendering, the browser draws partial objects on the display as data for each of the multiple objects arrives from the server. The result is that a user views the page as the browser progressively assembles it. This is important since a progressive rendering browser maintains a user's interest despite delays caused by moving large objects over a low-bandwidth connection. Furthermore, the user can interact with those portions of the page already displayed without having to wait for the remaining portions to arrive. FIGS. 5A–5E illustrate a sequence of displays 150 (FIG. 5A), 152 (FIG. 5B), 154 (FIG. 5C), 156 (FIG. 5D), 158 (FIG. 5E) for the Jammer home page 100 of FIG. 1 as it undergoes progressive rendering. To support progressive rendering, the browser interprets HTML commands from the base object as it arrives from the server. Upon locating a reference to an embedded object such as image object 142 of FIG. 4, the browser dispatches a request for its object data. Thus, it is possible to have multiple overlapping object data transfers from the server to the browser while the browser is still parsing and interpreting HTML from the base object defining the page.

Figure 6:
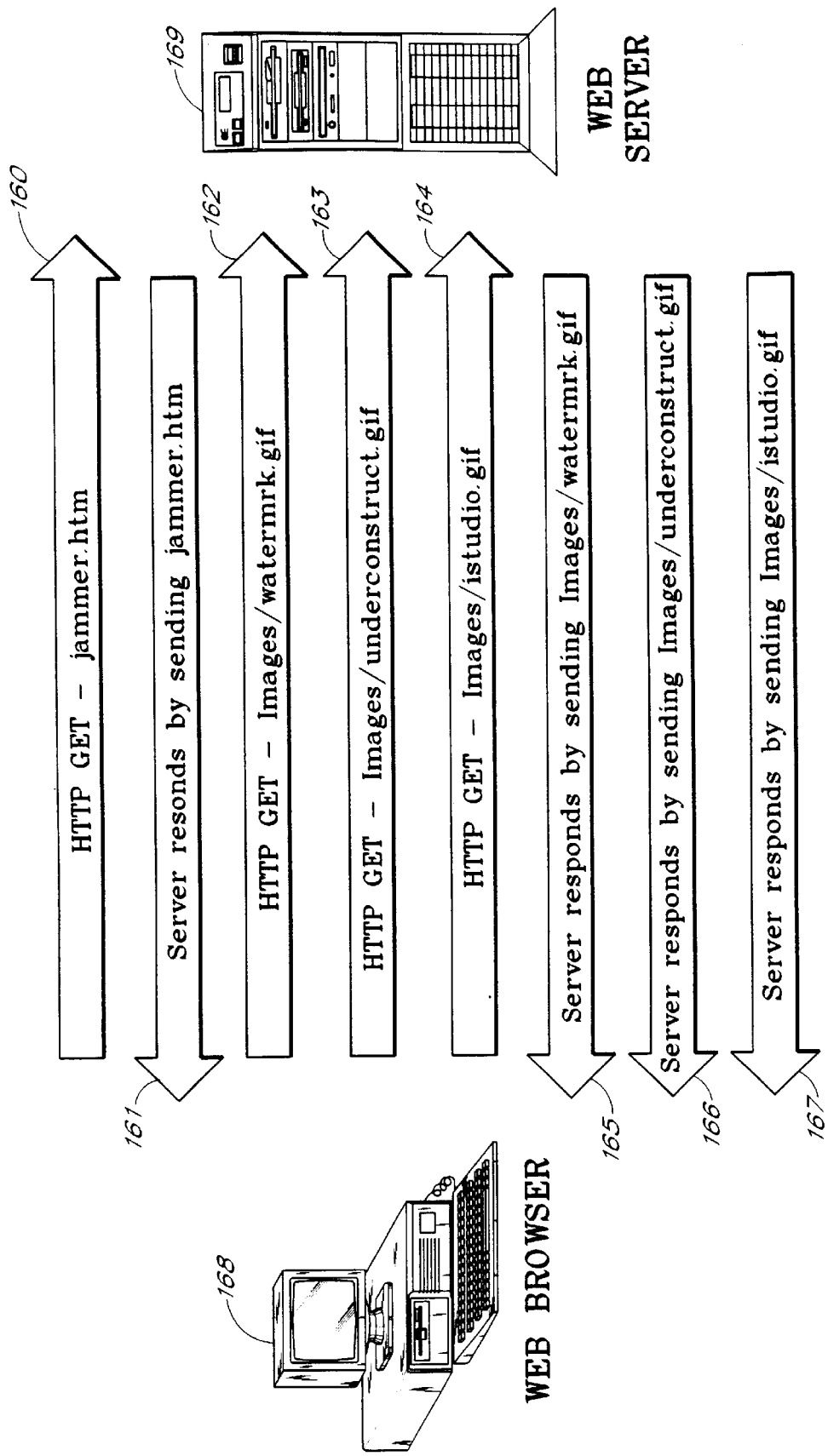
FIG. 6 illustrates a sequence of browser requests and server responses for a progressively rendered Web page, such as shown in FIG. 1b.

FIG. 6 illustrates a sequence of overlapping transactions needed to progressively render the Jammer home page 100 of FIG. 1. The first transaction 160, a get request, initiates transfer of the base object, jamhome.htm, from the server 169 to the browser 168. In the next transaction 161, the server 169 responds by serially transmitting HTML from the jamhome.htm file. As the browser 168 interprets the HTML, it finds a reference to the background image object 142 and initiates the next transaction 162, a corresponding get request for the watermark.gif file. The server 169 continues to serially transmit HTML from the jamhome.htm file while it locates and prepares the watermark.gif file for transfer. The browser 168 then finds a reference to the under construction image object 144 and initiates another transaction 163, a get request for the underconstruction.gif file. The server 169 continues to serially transmit HTML from the jamhome.htm file while it now locates and prepares both the watermark.gif and underconstruction.gif files for transfer. The browser 168 now locates a reference to the Internet Studio image object 146 and initiates transaction 164, a get request for the istudio.gif file. The server 169 then transfers object data for watermark.gif 165, underconstruction.gif 166 and istudio.gif 167.

An HTTP server, such as server 169 of FIG. 6, can receive multiple requests from a single browser, such as browser 168, as well as multiple requests from multiple browsers. The server 169 can handle multiple transactions simultaneously using the multitasking services provided by its operating system. These multitasking services allow a server to create and coordinate the execution of objects, or tasks. The operating system allocates a small time slice for each task to run. Because these time slices are very small, the operating system switches between them rapidly to create the impression that multiple tasks are executing simultaneously. However, in reality, the operating system executes small portions of each task sequentially. Although the operating system executes the instructions for each task in the correct order, the actual instructions executed by the operating system across all of its tasks includes small portions of each task interleaved in an essentially random order. Multitasking facilities differ between operating systems. For example, in the Unix operating system, a server spawns multiple processes (i.e., tasks), each to handle a single transaction. Under Windows 95 and Windows NT, both licensed by Microsoft, a server uses multiple threads, with each thread handling a transaction. For Unix, Windows 95 or Windows NT, each thread or process is responsible for retrieving the requested data from a disk, database, executable code or other process, formatting the data for transmission over the network, encoding the data according to the selected method, and sending it to a client's browser by writing the formatted, encoded data to the network connection opened by the client.

Figure 7:
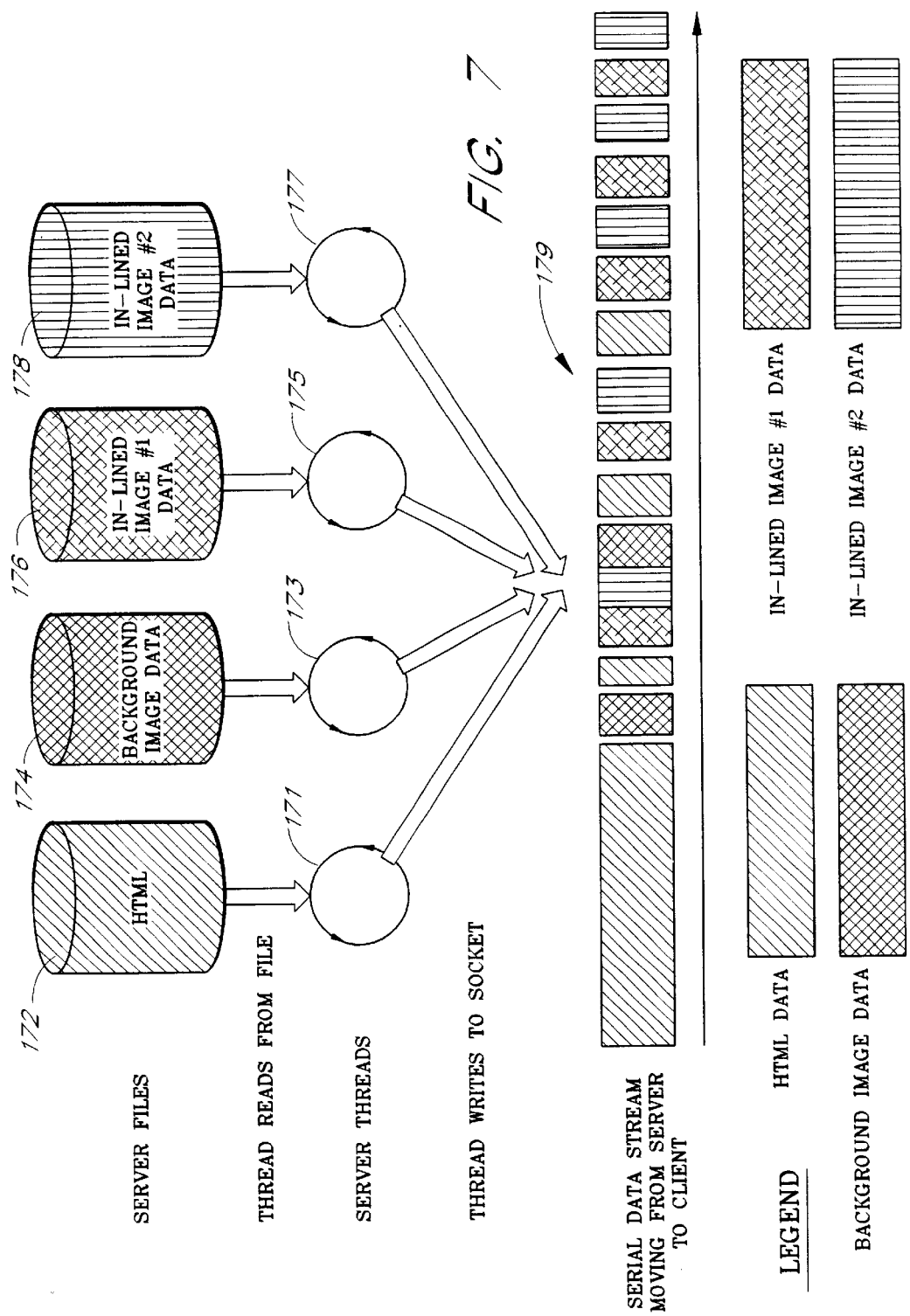
FIG. 7 is a block diagram of a serial data stream created from multiple, overlapping object requests serviced by a multitasking server.

Referring now to FIG. 7, a multitasking server transfers a serial data stream 179 over the Web for progressive rendering on a client. Each time the browser issues a request to the server to retrieve an object, the server creates a task to handle the transaction. As shown in FIG. 7, a HTML thread 171 retrieves, formats and transmits HTML data 172 while a background image thread 173 retrieves object data for a background image 174, a first image thread 175 retrieves object data for a first image 176 and a second image thread 177 retrieves object data for a second image 178. As each of these threads 171, 173, 175, 177 executes during its time slice, it retrieves, formats and transmits a data fragment to the client. Note that the formatting operation includes insertion of an HTTP header in each of the data fragments resulting from execution of the thread 171, 173, 175, 177. Due to time sliced multitasking, data fragments having small portions of the object data for each of these four objects are interspersed to form the serial data stream 179. The interspersed stream enables a progressively rendering browser to display the data fragments as they arrive. Thus, although a single thread, such as the HTML thread 171, transmits data packets in the correct order, the order of the data packets in the serial data stream 179 is essentially random. This is a result of multitasking as the initiation and completion of tasks to request data, allocate threads and return data from each thread is also essentially random. Moreover, it is not possible to arrange delivery of data fragments in a selected order in these multitasking systems. Upon receipt of the data stream 179, the browser removes HTTP header information and progressively renders images from the data fragments of the respective object data transferred.

II. Jammer Data Format

A preferred embodiment of the present invention is a flexible data format that enables the combination of object data from multiple objects comprising a set of related objects, such as a HTML page having embedded images, into a single data stream. In this manner, a browser can retrieve all of the objects in a single request by receiving and processing the data stream as if multiple requests had been made. This flexible data format is advantageous because, unlike an HTTP extension or other protocol, it does not require changing existing HTTP infrastructure or protocols, such as firewalls and proxies. Likewise, the data format does not require changing how the browser works. Thus, one can implement the data format by publishing data in the Jammer format on the server and unpacking a Jammer data stream using a proxy that understands the Jammer data format, and how to unpack it, on the client.

Figure 8:
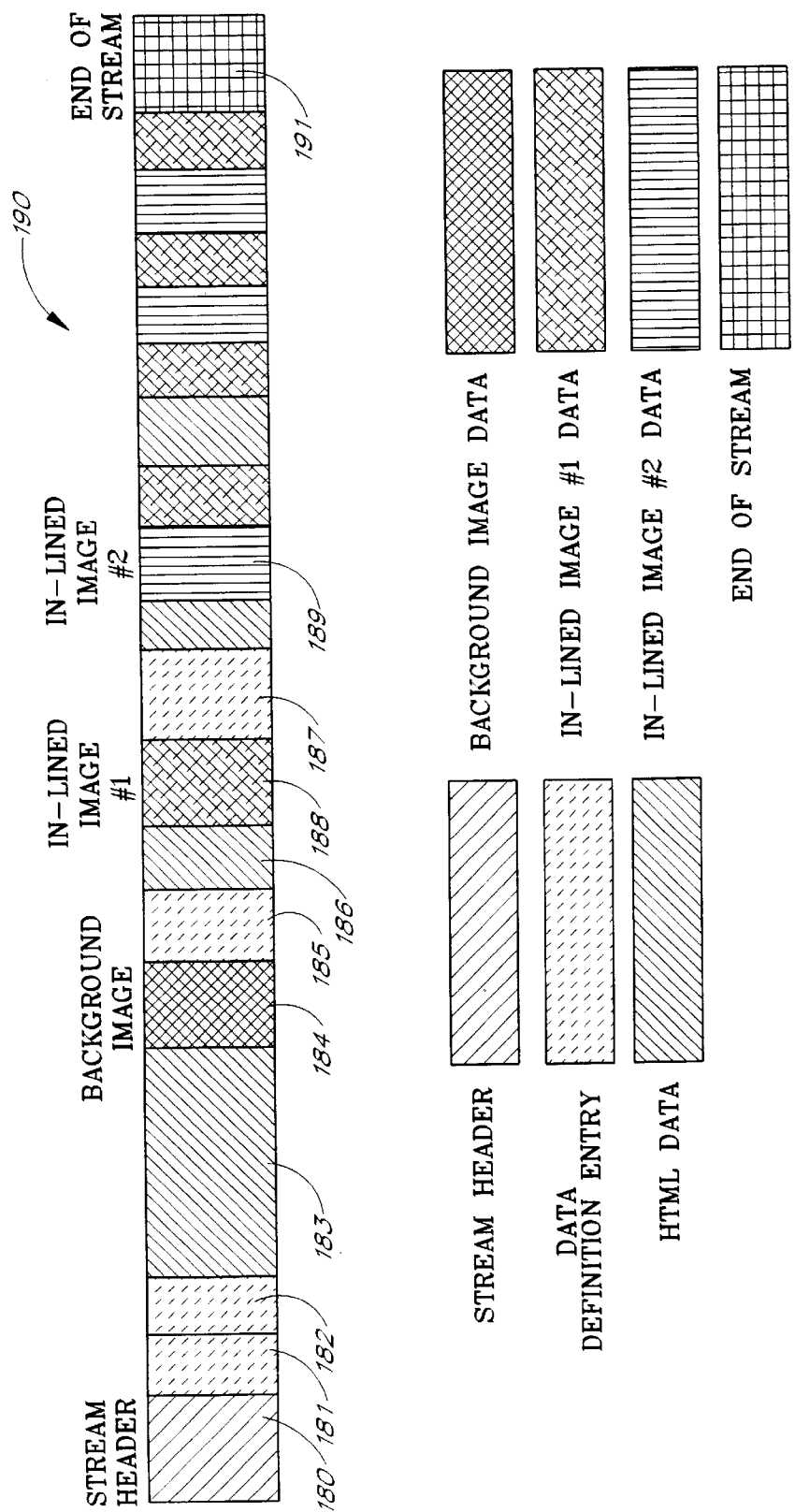
FIG. 8 is a data diagram showing the structure of a serial data stream prepared in the data format of the present invention.

Referring now to FIG. 8, a data stream 190 prepared according to an embodiment of the present invention is illustrated. The data stream 190 includes a general purpose Stream Header 180 followed by a series of interleaved records of two types: Data Definition Entries and Data Packets. The Stream Header 180 provides information about how the server packed the data into the data stream 190. This includes the version number used to prepare the data stream 190, as well as optional entries to define the number of objects in the data stream 190 and the total size of the data stream 190. The Stream Header 180 is extensible and includes ASCII text with one header per line, similar in format to an HTTP header.

As shown in FIG. 9, a data definition entry 192 provides information about a single object that is present in the data stream 190. The data definition entry 192 is the first reference to an object having object data within the data stream 190. The data definition entry 192 includes information about the object, but no object data. The information typically includes an object identifier 194, such as its URL, a stream identifier number (SID) 196 to identify data packets belonging to the stream and other previously described HTTP header information 198, such as language encoding, content length of data and the date of last modification. As shown in FIG. 10, a data packet 200 comprises a SID 202, the number of bytes in the data packet 204 and object data 206. Note that a data packet does not have to include all of the object data for an object. Thus, in the Jammer data format, the contents of an object may be distributed among a plurality of data packets.

Referring back to FIG. 8, data stream 190 includes data packets for an HTML base object 183, 186, a background image object 184, a first image object 188 and a second image object 189. A data definition entry for an object must precede the first data packet for that object in the data stream 190. Additionally, the data definition entry for an object must precede any references to that object in the data packets for any other objects in the stream. For example, data definition entries, such as 181, 182, 185, 187 (FIG. 8) for embedded images (142, 144, 146) in the stream must precede references to those embedded images in the HTML base object (FIG. 4). The data definition entries facilitate unpacking of the data stream 190 because they define which objects are present in the data stream 190 and provide information about those objects. In this manner, data definition entries in the data stream 190 serve to notify a browser that unpacks the data stream of all objects present in the data stream. Moreover, the process of interleaving object data and data definition entries into a data stream 190 can occur either prior to or at the time the server sends data to the browser. Thus, for Web pages including a static set of objects, the server may create and store a data stream 190 prior to the time a browser requests the page. Similarly, for Web pages including objects having frequently changing data, such as an object having the results of a database query, or for which an object set is dynamically created at the time of a browser request, the server creates and transmits a data stream 190 at the time of the browser request.

Furthermore, the data format of the present invention permits optimization of the sequence of object data records. By modifying the sequence of object data records in the data stream 190, it is possible to control how a page is displayed on a client's browser. As discussed previously, there is no particular order to the display of data fragments in current browsers supporting progressive rendering. When a request is made for an image, for example, a prior art browser waits for the data from the server and displays the data as it is received. In contrast, a browser of the present invention knows at the time an object is requested whether it is present in the data stream 190 because data definition entries for all objects present in the data stream 190 precede references to those objects. Thus, when an object is being requested, if a browser of the present invention has already determined from the data definition entries that the object is present in the stream, the browser displays the data packets of the object as they are received instead of initiating a get request for the object from the server. The present invention allows configuration of a data stream to have object data prioritized, so that the author of the page may control the order in which the browser actually receives object data. For example, the author of a page may desire that the browser display a particular advertising image first to ensure that a viewer sees the advertising before anything else. Similarly, the author may desire that a viewer sees all the embedded images on a page prior to the background image. The Jammer data format permits the author to select the sequence of delivery and display of object data to create a desired effect on the viewer.

Figure 13:
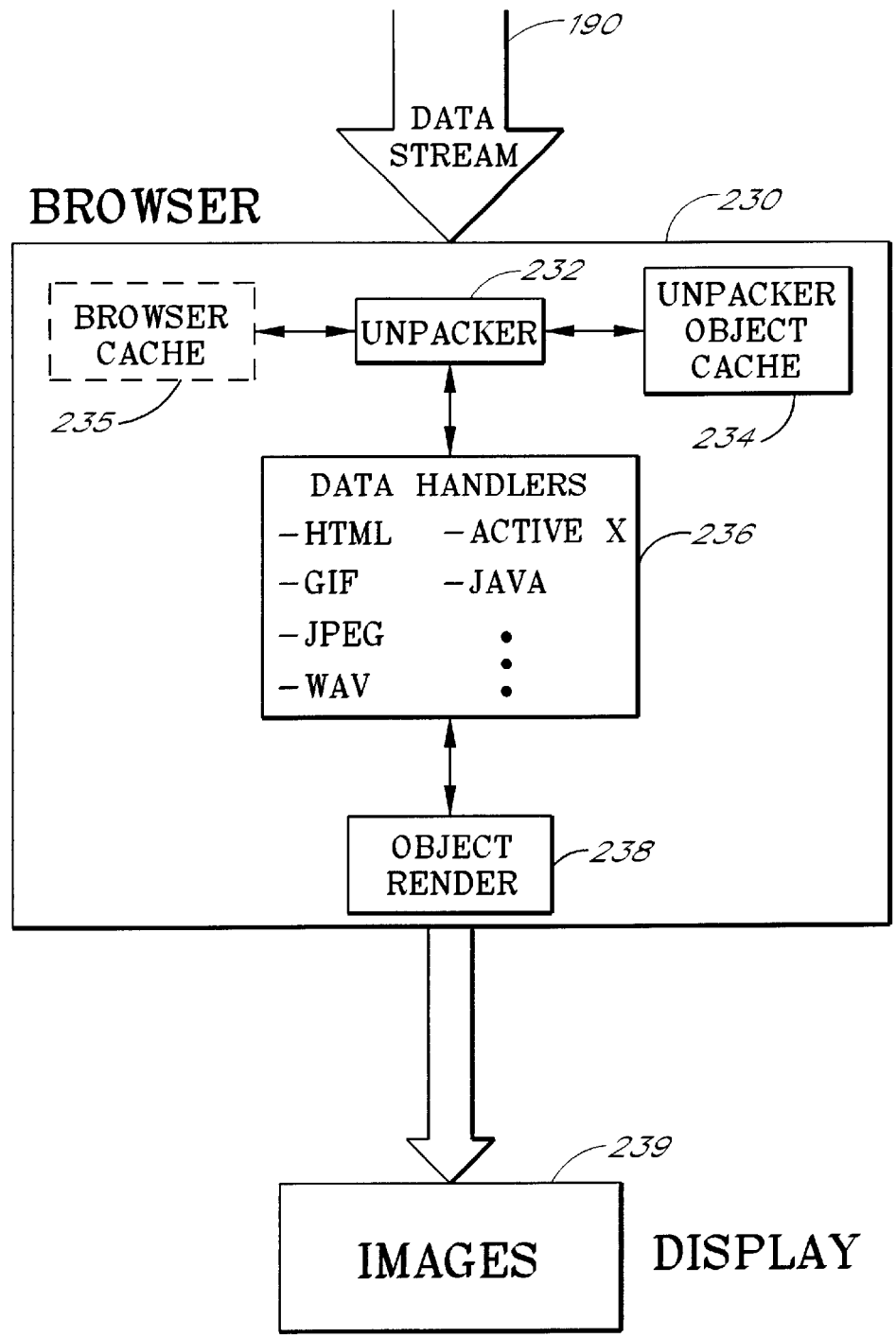
FIG. 13 is a block diagram of a browser supporting the data format of the present invention.

The process of unpacking the data stream 190 shown in FIG. 8 occurs as follows. Upon request for the base object, the server returns the data stream 190. As the browser receives the data stream 190, it interprets the stream header 180, recognizes that the data to follow is in the Jammer data format and then begins to unpack the data stream 190. A first data definition entry 181 follows the stream header 180 and provides the browser with information about the base object. A second data definition entry 182 having information on a background image follows the first data definition entry 181. The browser then reads the first data record 183 and recognizes HTML data. The browser invokes its HTML handler to parse and display data from the first data record 183. A second data record 184 follows in the data stream 190. Using information from the second data definition entry 182, the browser determines that data in the second data record 184 corresponds to the background image and reads this data into a cache 234 (FIG. 13).

Referring again to FIG. 8, the following record in the data stream 190 is a third data definition entry 185. The third data definition entry 185 provides the browser with information on a first image object for later use. The next record in the data stream 190 is additional HTML data 186 from the base object. In parsing this additional HTML data 186, the HTML handler finds a reference to the background image and issues a request for it. The browser's cache manager receives the request for the background image data and returns the data for the background image it holds in cache for the second data record 184. In addition, the HTML handler finds a reference to the first image object while interpreting the additional HTML data 186. As no object data for the first image object exists in the data stream 190 up to this point, the browser dispatches a request for the first image object. The remainder of the data stream 190 includes a data definition entry for a second image object 187 as well as object data for the first image 188 and the second 189 image. Unpacking of the remaining records in data stream 190 proceeds by continuation of the method described above. Unpacking of the stream 190 terminates upon detection of an end of stream indicator 191.

III. Data Storage, Retrieval and Transfer Systems

Figure 11:
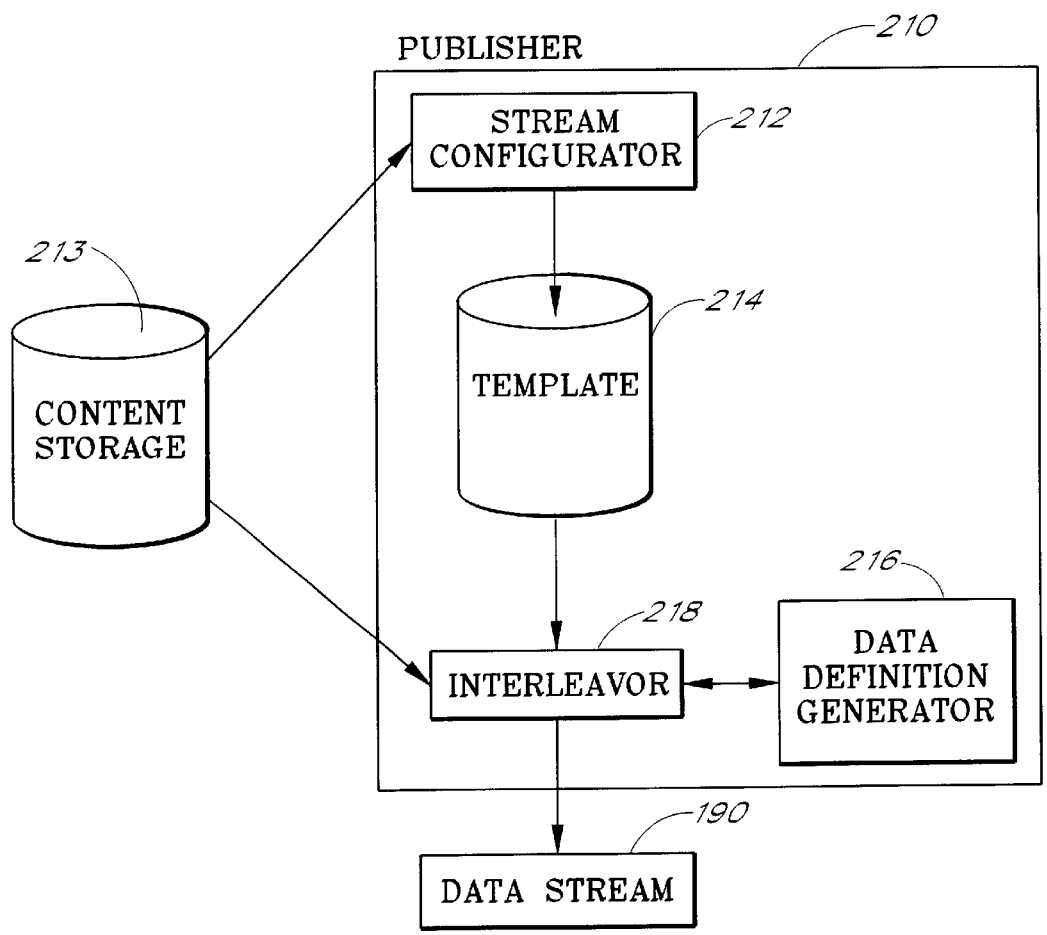
FIG. 11 is a block diagram of a publisher supporting the data format of the present invention.

The Jammer data format is useful in a variety of computer environments having data storage. In a preferred embodiment, a publisher stores object data in a data repository in various formats including the Jammer data format. As shown in FIG. 11, a publisher 210 includes a stream configurator 212, a template 214, an interleavor 216 and a data definition generator 218. The stream configurator 212 parses through a page stored in a content storage 213 to identify references to objects and their locations within the page. Content storage 213 includes objects having a variety of object data types, such as HTML, JPEG, WAV, GIF and BMP data. The stream configurator 212 also receives information about the objects, such as the sequence in which the objects comprising the page are to be displayed, and produces a stream configuration template 214. The following pseudo-code illustrates an implementation of a template 214 of the present invention:

Function MakeStreamConfigurationTemplate (InputFileName)

The InputFileName is the name of the HTML or other file that contains references to the other files.

This routine creates the Stream Configuration Template. Each record has the following data:
ObjName—the name of the object
ObjNum—the object number (the first object is 1, the second 2, etc.)
ObjParent—the object number of the object that references this object.
ObjOffset—the number of bytes from the start of the parent object at which the reference occurred.
User supplied display sequence information. This provides information to the Interleavor for the order in which to display the objects.
Write a record for the Input File to the template file.
Set ObjName to InputFile,
Set ObjNum to 1,
Set ObjParent to 0 (since this is the root object),
Set ObjOffset to 0.
This first record is for the main object (i.e. the HTML file) that includes references to the other objects.
Set ObjectCount to 2
Read the HTML file, and find all of the references to objects, such as gifs, Java Applets,
ActiveX controls that it contains.
For each object that you find
 Write a record for the object to the template file.
 Set ObjName to URL of the object,
 Set ObjNum to ObjectCount,
 Set ObjParent to 1,
 Set ObjOffset to the offset in bytes that the reference was found in the HTML file.
 Write Display ordering information
 Set ObjectCount=ObjectCount+1
End A skilled artisan may modify the template 214 pseudo-code to accommodate nested objects. For example, in the template 214, objects referenced by another object, a parent object, appear after the parent object. The ObjParent field of the referenced object is set to the object number of the parent object. In addition, the ObjOffset field of the referenced object is then set to the value of the offset in the parent object for which the reference was found.

A data definition generator 216 interprets the stream configuration template 214 to create a data definition entry for each object included in the data stream 190. An interleavor 218 also interprets the stream configuration template 214 to produce a data stream 190 by interleaving data definition entries provided by the data definition generator 216 with object data provided by content storage 219. The interleavor 218 uses the display sequence information to determine how to interleave the object data in the data stream 190 so as to ensure that the data definition entry for each object precedes any of its object data packets in the data stream 190. Thus, the interleavor 218 writes object data into the data stream 190 for those objects having a lower sequence number prior to the object data for those objects having a higher sequence number. The following pseudo-code illustrates an implementation of a publisher 210 of the present invention:

Function MakeJammedStream (StreamConfigurationTemplate)

This function takes as input a Stream Configuration Template. It reads in the various data files that template references (HTML, GIF, etc.) and produces the Jammed interleaved file.

This routine reads records from the Stream Configuration Template.

Each record has the following data:
- ObjName—the name of the object
- ObjNum—the object number (the first object is 1, the second 2, etc.)
- ObjParent—the object number of the object that references this object.
- ObjOffset—the number of bytes from the start of the parent object at which the reference occurred.
- User supplied display sequence information. This provides information to the Interleavor for the order in which to display the objects.

Set countOfBytesWritten to 0

The countOfBytesWritten is the counter of how many bytes of the HTML file have been written to the Jammed File. The reason that we need this, is that we must write a data definition entry for a referenced object before we write the reference to that object in the HTML file. Since each record in the configuration template has the offset in the file of where the reference appears, and the records are in the order that they appeared in the HTML file, as we read each record, we can compare the offset with how much of the parent has been written. In this way, we can optimize when we write the data definition entries to the stream. Note that to support nested objects, that is objects whose ObjParent is greater than 1, we would need to maintain counters of how much of each of the parent objects had been written.

Read the first record from the StreamConfigurationTemplate
Call the DataDefinitionGenerator to create a data definition entry for the first record.
Add the first record to the activeObjectsList the activeObjectsList is the list of objects for which data definition entries have already been written to the stream, and for which we are currently writing data packets.

While there are still records in the StreamConfiguration-Template

Figure 12:
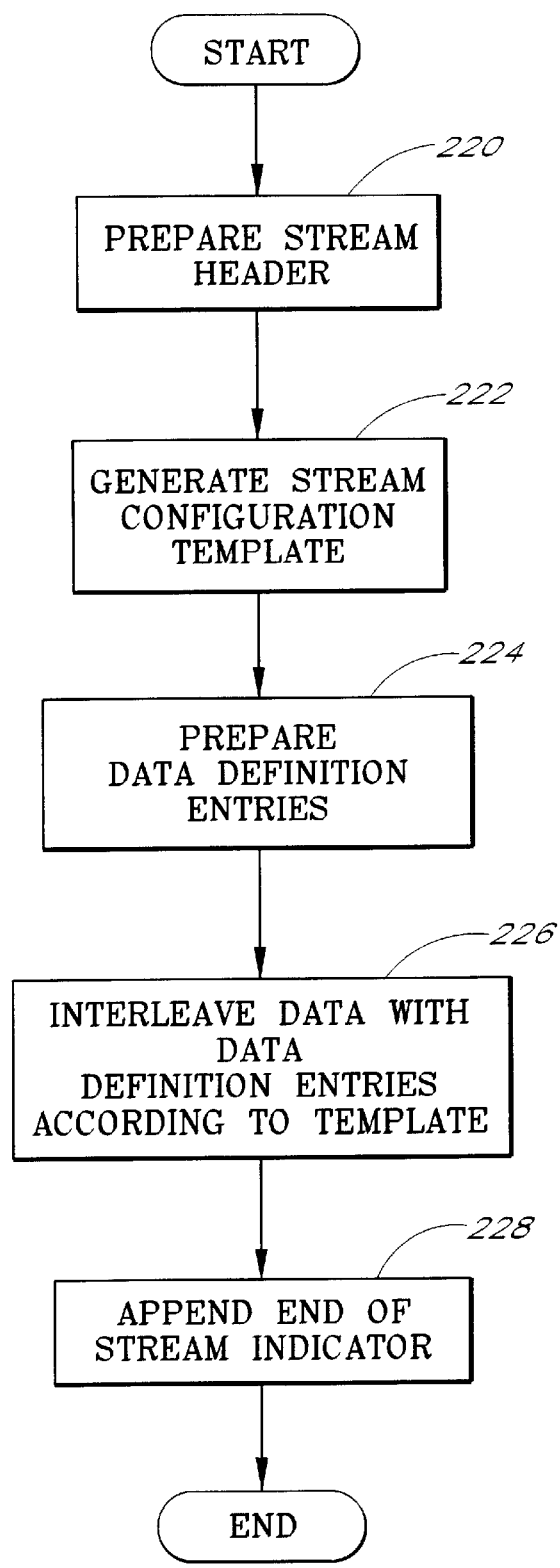
FIG. 12 is a flowchart illustrating the process flow of a publisher of the present invention.

Read a record from the template, and set it to currentRecord.
If countOfBytesWritten is less than currentRecord.ObjOffset
While countOfBytesWritten is less than currentRecord.ObjOffset
Write out data packets for each object in the activeObjectsList.
If we write out data from the first object, add the bytes written to countOfBytesWritten
if we finish writing data for any of the objects, remove them from the activeObjectsList
end While
end if
Call the DataDefinitionGenerator to create a data definition entry for currentRecord.
Add currentRecord to the activeObjectsList before all objects with a lower priority as determined by the user supplied ordering information.
end While
While activeObjectsList contains 1 or more objects
Write out data packets for each object in the activeObjectsList.
if we finish writing data for any of the objects, remove them from the activeObjectsList
end While
End Reference is now principally made to FIGS. 8, 11 and 12 which illustrate the process flow of the publisher 210 (FIG. 11) of the present invention. At state 220, the publisher 210 prepares a stream header 180 to indicate that the data to follow is prepared using the data format of the present invention. The publisher 210 proceeds to state 222 where it generates a stream configuration template 214 including information regarding objects defined by a page, their locations on the page and their sequence of display. At state 224, the publisher 210 prepares data definition entries 192 (FIG. 9) for each object defined by the page. Note that the publisher 210 may generate the template 214 and prepare the data definition entries 192 (FIG. 9) concurrently. At state 226, the publisher 210 interleaves object data packets 200 (FIG. 10) with data definition entries 192 (FIG. 9) according to the sequence defined by the stream configuration template 214 so as to form a data stream 190. Lastly, the publisher 210 appends an end of stream indicator 191 to indicate the end of the data stream 190.

FIG. 13 illustrates the structure of a browser 230 of one embodiment of the present invention. In contrast to prior art browsers, the browser 230 of the present invention supports data transfer using the data format of the present invention as well as those of standard TCP and HTTP protocols. The browser 230 includes an unpacker 232 to receive an incoming data stream, such as the data stream 190 (FIG. 8), from a server 106 (FIG. 1a). The unpacker 232 communicates with an unpacked object cache (UOC) 234 to store object data received in the Janmuer data format. In addition, the unpacker 232 may communicate with a browser cache 235 to store received object data that is not encoded in the Jammer data format. The browser cache 235 operates in the conventional manner of prior art browsers, such as Microsoft Internet Explorer and Netscape Navigator, which is well known. The unpacker 232 identifies the data type of an object in the data stream 190 and invokes a data handler 236 to interpret the object data. The data handler 236 is capable of interpreting a wide variety of data types, such as HTML, GIF, JPEG, WAV, ActiveX and Java applets. The data handler 236 in turn passes the interpreted object data to an object renderer 238 to render on a display 239 for viewing.

Figure 14:
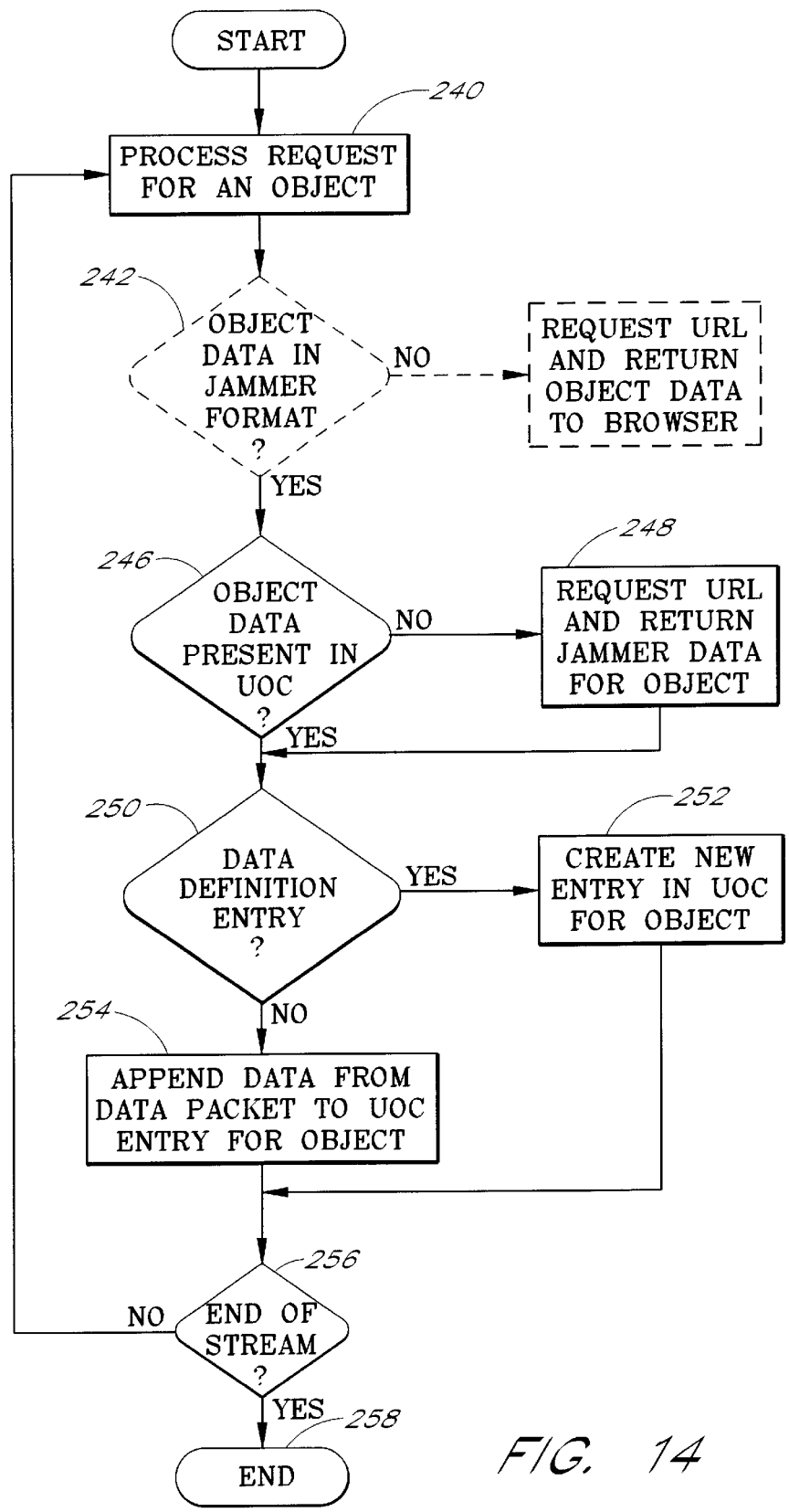
FIG. 14 is a flowchart illustrating the process flow of a browser unpacking a data stream encoded in the data format of the present invention.

In conjunction with FIG. 13, FIG. 14 illustrates the process by which a browser 230 (FIG. 13) unpacks a data stream 190 (FIG. 8) encoded in the data format of the present invention. At state 240, the unpacker 232 of the browser 230 processes a request for an object. For example, when the user points and clicks on a hyperlinked object on a Web page, the browser 230 issues a request, such as a URL, for the object. At state 242, the unpacker 232 may determine if the requested object data is in the Jammer format. If not, then the unpacker 232 issues a request to the server 106 (FIG. 1a) at state 244 to return the object data in the conventional format of the prior art. Otherwise, at state 246, the unpacker 232 checks the UOC 234 to determine if the requested object is present. If the object is not present in the UOC 234, the unpacker 232 proceeds to state 248 to issue a request to the server 106 (FIG. 1a) to return the requested object data in the Jammer format. Otherwise, the UOC 234 returns the requested object. The unpacker 232 proceeds to state 250 to determine if the returned data is a data definition entry 192 (FIG. 9). If a data definition entry 192 (FIG. 9) is found, the unpacker 232 proceeds to state 252 to create an entry in the UOC 234 for the object corresponding to the data definition entry 192 (FIG. 9). Otherwise, an object data packet 200 (FIG. 10) is encountered and the unpacker 232 proceeds to state 254 where it appends data from the data packet 200 (FIG. 10) to the entry in the UOC 234 corresponding to the object and forwards the data to the browser if it has been previously requested. Lastly, the browser 230 proceeds to state 256 where it checks for the end of stream indicator 191 (FIG. 8). If the indicator is found, the process terminates at state 258. Otherwise, the process continues at state 240.

Now referring principally to FIG. 13, when the unpacker 232 receives a data stream 190 (FIG. 8), it examines the stream header 180 (FIG. 8) to determine if the data is encoded in the Jammer data format. If the data is encoded in the Jammer data format, the unpacker 232 proceeds to the first data definition entry, which identifies the base object. Since the base object is the object that the browser 230 initially requested, an entry is created for this object in the UOC 234 and data packets for this object will be sent to the browser. When the browser 230 encounters a reference to another object, it makes a request to the unpacker 232 for the object. Because a data definition entry for an object must precede any references to the object in the data stream 190 (FIG. 8), when the unpacker 232 searches the UOC 234, the object has an entry in the UOC 234, which returns the found object to the browser 230 immediately. Otherwise, the unpacker 232 searches the browser cache 235 to locate the requested object. If the unpacker 232 is unable to locate the requested object within the UOC 234 or the browser cache 235, the unpacker 232 requests the object from the server. The following pseudo-code illustrates an implementation of an unpacker 232 of the present invention:

Function GetObject(URL objName)
   This funtion is what the Browser calls when it wants to get a particular URL. It is implemented by the Unpacker. It returns the data for the object specified by the URL objName.
   Check the UOC to see if an entry already exists for this URL.
   If URL is present in UOC
     return the object from the UOC
   else if cacheManager has URL
     return the object from the cache
   else
     contact remote host specified in URL, and request object.
     if host reports error
       return error code
     else if object is not jammer encoded format
       return object to browser
     else
       At this point, we have obtained the object from the server, and it is encoded in the Jammer Encoded Format.
       Get first record from stream
       if record.type is not data definition entry
         end connection to server
         return error code
       else
         create, new entry for object in UOC
       While GetNextRecordFromStream returns success
         if record.type is a data definition entry
           add to UOC
         if record.type is a data packet
           find the corresponding entry in the UOC, and append the data to the object.
           if object is currently being read from the UOC by the browser
             send this data to browser
           end if
       end While
   end else
end Function GetObject In another embodiment of the present invention, the unpacker resides on a web server proxy in communication with the browser 168 (FIG. 6) and with the server 169 (FIG. 6). In this embodiment, the web server proxy intercepts communications between the browser 168 and the server 169. The web server proxy includes an unpacker and an unpacker object cache. In a similar fashion, the unpacker examines the stream header 180 (FIG. 8) to determine if the data stream 190 (FIG. 8) from the server 169 is encoded in the Jammer data format. If so, the unpacker of the web server proxy unpacks the data stream 190 (FIG. 8) as described above and forwards the unpacked data to the browser 168. In this manner, the data format of the present invention may be used with a conventional browser 168 of the prior art.

Referring back to FIG. 1a, in another preferred embodiment, the data repository comprises a server 106 linked to the World Wide Web 104 portion of the Internet. The server 106 communicates with storage devices for holding object data. These storage devices may communicate directly or indirectly with the server and may reside separately, on the server computer itself, within other servers communicating with the server or among a plurality of computers linked to the Internet. Storage devices include magnetic disk drives, electronic memory, optical disk drives, magnetic tape and other devices used to stored data. The browser comprises a client 102 having a viewing device and the browser communicates with the server 106 through the World Wide Web 104. Viewing devices for the client 102 include CRT monitors, flat panel displays, projection displays and other display devices. In one sense, a server 106 is any device capable of locating, storing, retrieving and transferring object data and a client 102 is any device capable of requesting, receiving and displaying object data. Servers and clients can be stationary or mobile and may communicate using conventional land lines or wireless technologies, such as satellite, cellular or infrared.

In yet another preferred embodiment, the data repository comprises a server 106 linked to an intranet 104. The intranet 104 functions in a manner similar to that of the World Wide Web. However, for security reasons, the intranet 104 is not connected to the Internet. The server 106 communicates with storage devices for holding object data. These storage devices may communicate directly or indirectly with the server and may reside separately, on the server itself, within other servers communicating with the server or among a plurality of computers linked to the intranet. Storage devices include magnetic disk drives, electronic memory, optical disk drives, magnetic tape and other devices used to store data. The browser comprises a client 102 having a viewing device and the browser communicates with the server 106 through the intranet 104. Viewing devices for the client 102 include CRT monitors, flat panel displays, projection displays and other display devices. In one sense, a server 106 is any device capable of locating, storing, retrieving and transferring object data and a client 102 is any device capable of requesting, receiving and displaying object data. Servers and clients can be stationary or mobile and may communicate using conventional land lines or wireless technologies, such as satellite, cellular or infrared.

In yet another preferred embodiment, the data repository comprises a network server 107 linked to a wide area network 108 or to a local area network 109. The network server 107 communicates with storage devices for holding object data. These storage devices may communicate directly or indirectly with the network server and may reside separately, on the network server itself, within other network servers communicating with the network server or among a plurality of computers linked to the wide or local area network. Storage devices include magnetic disk drives, electronic memory, optical disk drives, magnetic tape and other devices used to store data. The browser comprises a network client 103 having a viewing device and the browser communicates with the network server 107 through the wide area 108 or the local area network 109. Viewing devices for the network client 103 include CRT monitors, flat panel displays, projection displays and other display devices. As is well known in the art, network servers 107 and clients 103 are typically computing devices linked into a network using specialized software for communication and data transfer, such as Microsoft Windows NT or Novell Netware. Network servers 107 and clients 103 can be stationary or mobile and may communicate using conventional land lines or wireless technologies, such as satellite, cellular or infrared.

In yet another preferred embodiment, the data repository comprises a storage device 105 (FIG. 1*a*) communicating with a user computer 102. These storage devices may reside separately or within the user computer. Storage devices include magnetic disk drives, electronic memory, optical disk drives such as CD-ROMs, magnetic tape and other devices used to store data. The browser resides on the user computer 102 having a viewing device and the browser communicates with the storage device 105 through the user computer's processor. Viewing devices for the user computer 102 include CRT monitors, flat panel displays, projection displays and other display devices.

IV. Summary

The data format of the present invention advantageously overcomes important limitations of available and anticipated alternatives. The present invention substantially reduces the impact of latency on object retrieval by reducing the number of get and retrieve transactions to one. Although planned HTTP improvements enable multiple transactions per connection, the protocol extension does not reduce the number of transactions required to get multiple objects needed to display a multimedia page. Similarly, server push, a technique of enabling a server to interpret the HTML base object to find embedded objects, may reduce latency, but again does not reduce the number of transactions needed to transfer and display the page. Instead, server push merely transfers the burden of multiple object retrieval from the browser to the server. Moreover, server push does not permit an author to optimize the sequence of object data transfers. Another proposed alternative, multi-part MIME, permits assembly of multiple objects into a single data stream. However, in contrast to the present invention, multi-part MIME does not permit interleaving of object data, nor does it permit optimization of how objects and object parts are delivered, in a predetermined order.

Moreover, the data format of the present invention advantageously reduces server loading by eliminating the need for superfluous transactions. For example, a page having 15 objects currently requires 15 transactions to transfer. Thus, a server capable of handling 150 transactions/second can only deliver 10 pages/sec. In contrast, the present invention typically results in the transfer of a single larger data stream and this may degrade server performance slightly. Thus, even if the server is only capable of handling 100 transactions/second using the data format of the present invention, it can still deliver 100 pages/sec. Hence, a user practicing the present invention realizes a tenfold improvement over existing techniques.

Those skilled in the art may practice the principles of the present invention in other specific forms without departing from its spirit or essential characteristics. Accordingly, the disclosed embodiments of the invention are merely illustrative and do not serve to limit the scope of the invention set forth in the following claims.

What is claimed is:

1. A computer-readable medium having stored thereon a data structure, comprising:
   object data packets stored within the storage for each object in the stream; and
   at least one data definition entry corresponding to each object in the stream, wherein said at least one data definition entry is interleaved with said object data packets such that a data definition entry corresponding to one of the objects in the stream precedes any object data packets of said one object in the stream.

2. The computer-readable medium of claim 1, wherein said data definition entry corresponding to said one object in the stream precedes any reference to said one object from any other object in the stream.

3. The computer-readable medium of claim 1, wherein said object data packets are interleaved with said data definition entries so as to display objects in the stream in a selected order.

4. The computer-readable medium of claim 1, wherein said data definition entry comprises:
   an object identifier to identify an object in the stream corresponding to said data definition entry; and
   a stream identifier to identify object data packets belonging to the stream.

5. The computer-readable medium of claim 1, wherein said object data packet comprises:
   object data;
   a size indicator indicative of the amount of said object data packet; and
   a stream identifier number to identify object data packets belonging to the stream.

6. The computer-readable medium of claim 5, wherein said object data comprises text.

7. The computer-readable medium of claim 5, wherein said object data comprises image data.

8. The computer-readable medium of claim 5, wherein said object data comprises audio data.

9. A system for transmitting a page, comprising:
   a data repository for a stream representing the page, wherein said stream comprises object data packets interleaved with data definition entries;
   a browser assembling said object data packets with reference to said data definition entries so as to display the page represented by said stream; and
   a network communicating said stream between said data repository and said browser.

10. The system of claim 9, wherein said data repository comprises a server in communication with a storage device.

11. The system of claim 10, wherein said server comprises a computing device.

12. The system of claim 10, wherein said storage device comprises at least one storage device in direct communication with said server.

13. The system of claim 10, wherein said storage device comprises a plurality of storage devices distributed within said network.

14. The system of claim 9, wherein said browser comprises a client having a viewing device.

15. The system of claim 14, wherein said client comprises a computing device.

16. The system of claim 9, wherein said network comprises the World Wide Web portion of the Internet.

17. The system of claim 9, wherein said network comprises an intranet.

18. The system of claim 9, wherein said network comprises a wide area network.

19. The system of claim 9, wherein said network comprises a local area network.

20. A system for transmitting a page, comprising:
   a data repository for a stream representing the page, wherein said stream comprises object data packets interleaved with data definition entries;
   a browser assembling said object data packets with reference to said data definition entries so as to display the page represented by said stream; and
   a computer communicating said stream between said data repository and said browser.

21. The system of claim 20, wherein said data repository comprises at least one storage device.

22. The system of claim 21, wherein said at least one storage device comprises a CD-ROM.

23. The system of claim 20, wherein said browser comprises a viewing device in communication with said at least one storage device.

24. A computer-readable medium having computer-executable instructions for performing the steps comprising:
   preparing a header for indicating the data structure of a data stream;
   generating a stream configuration template for indicating the presence of embedded object data packets in the data stream wherein each embedded object data packet corresponds to an embedded object;
   preparing data definition entries for each embedded object data packet;
   interleaving embedded object data packets with data definition entries; and
   appending end of stream indicator for marking the end of the data stream.

25. The computer-executable instructions of claim 24, wherein the step of generating a stream configuration template includes determining the number of embedded object data packets, the location of embedded objects, and the order of display of embedded objects.

26. The computer-executable instructions of claim 24, wherein the step of preparing data definition entries includes identifying the embedded object data packet, generating data representative of the size of said embedded object data packet, and generating data representative of the identity of the data stream.

27. The computer-executable instructions of claim 24, wherein the step of interleaving embedded object data packets with data definition entries includes arranging the data definition entry preceding the corresponding embedded object data packet.

28. A computer-readable medium having stored thereon a data structure comprising:
   a first data field including data representing an object data packet;
   a second data field including data representing data definition for the object data packet, and stored preceding said first data field; and
   a third data field functioning as an end marker for the data structure and stored after said first and second data fields.

29. The data structure of claim 28 wherein the second data field precedes any reference to the first data field in the data structure.

30. The data structure of claim 28 including a plurality of first data fields and a plurality of second data fields and further wherein the number of first data fields is equal to the number of second data fields.

31. The data structure of claim 28 including a plurality of first data fields and an equal plurality of second data fields and further wherein the first data fields are interleaved with the second data fields.

32. The data structure of claim 28 wherein the second data field includes data representative of the identity of an object and data representative of the identity of the data structure.

33. The data structure of claim 28 wherein the first data field includes object data, and data representative of the size of said object data, and data representative of the identity of the data structure.

34. The data structure of claim 28 wherein the contents of the first data field is data selected from the group consisting of text data, image data and audio data.

* * * * *